(12) United States Patent
Uchimura et al.

(10) Patent No.: US 10,875,710 B2
(45) Date of Patent: Dec. 29, 2020

(54) CARGO MANAGEMENT DEVICE, CARGO MANAGEMENT METHOD, AND PROGRAM

(71) Applicant: NEC CORPORATION, Tokyo (JP)

(72) Inventors: Jun Uchimura, Tokyo (JP); Hideaki Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 144 days.

(21) Appl. No.: 16/083,544

(22) PCT Filed: Mar. 1, 2017

(86) PCT No.: PCT/JP2017/008095
§ 371 (c)(1),
(2) Date: Sep. 10, 2018

(87) PCT Pub. No.: WO2017/159364
PCT Pub. Date: Sep. 21, 2017

(65) Prior Publication Data
US 2019/0127145 A1 May 2, 2019

(30) Foreign Application Priority Data
Mar. 18, 2016 (JP) ................................ 2016-054714

(51) Int. Cl.
*B65G 1/137* (2006.01)
*B66F 9/24* (2006.01)
*B65G 67/04* (2006.01)

(52) U.S. Cl.
CPC ............ *B65G 1/137* (2013.01); *B65G 67/04* (2013.01); *B66F 9/24* (2013.01)

(58) Field of Classification Search
CPC ............ B65G 1/137; B65G 67/04; B66F 9/24

USPC .................................................. 700/213–215
See application file for complete search history.

(56) References Cited

U.S. PATENT DOCUMENTS

| 7,612,673 B2* | 11/2009 | Onderko | B66F 9/0755 235/383 |
| 7,725,212 B2* | 5/2010 | Prasse | B25J 5/007 700/214 |
| 9,007,178 B2* | 4/2015 | Nikitin | G06K 7/10009 340/10.1 |

(Continued)

FOREIGN PATENT DOCUMENTS

| JP | 2005-509575 A | 4/2005 |
| JP | 2007-106578 A | 4/2007 |

(Continued)

OTHER PUBLICATIONS

Part 2, Experiment / practical example, Utilizing IC tags in logistics operations, Nikkei BP Mook, All of wireless IC tag, Nikkei Business Publications, Inc. Apr. 20, 2004, p. 70-71.

(Continued)

*Primary Examiner* — Michael Collins
(74) *Attorney, Agent, or Firm* — Sughrue Mion, PLLC (57) ABSTRACT

A determination is made as to whether or not a first ID is detected by a first antenna provided at a fork of a forklift, a first tag being capable of receiving reflected waves of a radio signal transmitted from the first antenna, the first ID being transmitted from the first tag in response to reception of the reflected waves. A determination is made that a container to which no cargo tag is attached is being transported when the first ID is detected.

6 Claims, 10 Drawing Sheets

(56) References Cited

U.S. PATENT DOCUMENTS

| | | | |
|---|---|---|---|
| 9,415,513 B2* | 8/2016 | Tian | B25J 9/1666 |
| 2006/0255951 A1* | 11/2006 | Roeder | G06K 7/10336 |
| | | | 340/572.7 |
| 2007/0169977 A1* | 7/2007 | Ellis | B66F 13/005 |
| | | | 180/170 |
| 2008/0106468 A1* | 5/2008 | Litva | G01V 15/00 |
| | | | 342/451 |
| 2012/0191272 A1* | 7/2012 | Andersen | B66F 9/24 |
| | | | 701/2 |
| 2013/0041524 A1 | 2/2013 | Brey | |
| 2014/0197926 A1* | 7/2014 | Nikitin | G06K 7/10356 |
| | | | 340/10.1 |

FOREIGN PATENT DOCUMENTS

| | | |
|---|---|---|
| JP | 2007-230717 A | 9/2007 |
| JP | 2008-19046 A | 1/2008 |

OTHER PUBLICATIONS

International Search Report for PCT/JP2017/008095 dated Jun. 6, 2017 [PCT/ISA/210].
Communication dated Mar. 27, 2020 from Japanese Patent Office in JP Application No. 2016-054714.

* cited by examiner

FIG. 15

CARGO MANAGEMENT DEVICE, CARGO MANAGEMENT METHOD, AND PROGRAM

CROSS REFERENCE TO RELATED APPLICATIONS

This application is a National Stage of International Application No. PCT/JP2017/008095, filed on Mar. 1, 2017, which claims priority from Japanese Patent Application No. 2016-054714, filed on Mar. 18, 2016, the contents of all of which are incorporated herein by reference in their entirety.

TECHNICAL FIELD

The present invention relates to a cargo management device, a cargo management method, and a program.

BACKGROUND ART

In the logistics industry, cargo distribution management is performed by reading identification numbers of cargos from radio frequency identification (RFID) tags attached to the cargos. Techniques for performing management of cargos using RFID tags are disclosed in Patent Literature 1 and Non-Patent Literature 1.

CITATION LIST

Patent Literature

[Patent Literature 1] Japanese Unexamined Patent Application, First Publication No. 2008-19046

Non-Patent Literature

[Non-Patent Literature 1] Part 2. Experiments/practical cases, Utilization of IC tags in logistics work, "Nikkei BP Mook, All of wireless IC tag", Nikkei BP Inc., Apr. 20, 2004, p. 70-71

SUMMARY OF INVENTION

Technical Problem

In the technique of Patent Literature 1 described above, a technique for reading ID information of an RFID tag attached to a container when a forklift inserts a fork-shaped arm into the container is disclosed. Further, the same technique is also described in Non-Patent Literature 1.

However, when the RFID tag is not attached to the cargo itself, appropriate management cannot be performed.

Accordingly, an object of the present invention is to provide a cargo management device, a cargo management method and a program that solve the above-described problem.

Solution to Problem

According to a first aspect of the present invention, a cargo management device includes a cargo management unit configured to determine whether or not a first identifier (ID) is detected by a first antenna provided at a cargo gripping mechanism of a transport vehicle, wherein a first transmission device is provided at a predetermine position of the transport vehicle so as to receive reflected waves of a radio signal transmitted from the first antenna, and the first ID is transmitted from the first transmission device in response to reception of the reflected waves; and a transport state determination unit configured to determine that a cargo to which no cargo ID transmission device is attached is being transported when the first ID is detected.

According to a second aspect of the present invention, a cargo management method includes determining whether or not a first ID is detected by a first antenna provided at a cargo gripping mechanism of a transport vehicle, wherein a first transmission device is provided at a predetermine position of the transport vehicle so as to receive reflected waves of a radio signal transmitted from the first antenna, and the first ID is transmitted from the first transmission device in response to reception of the reflected waves; and determining that a cargo to which no cargo ID transmission device is attached is being transported when the first ID is detected.

According to a third aspect of the present invention, a program causes a computer of a cargo management device to function as: a cargo management means that determines whether or not a first ID is detected by a first antenna provided at a cargo gripping mechanism of a transport vehicle, wherein a first transmission device is provided at a predetermine position of the transport vehicle so as to receive reflected waves of a radio signal transmitted from the first antenna, and the first ID is transmitted from the first transmission device in response to reception of the reflected waves; and a transport state determination means that determines that a cargo to which no cargo ID transmission device is attached is being transported when the first ID is detected.

Advantageous Effects of Invention

According to the present invention, it is possible to manage a cargo to be transported by a transport vehicle without obtaining hydraulic pressure information of a cargo gripping mechanism of the transport vehicle.

DESCRIPTION OF EMBODIMENTS

First Embodiment

Hereinafter, a cargo management device according to a first embodiment of the present invention will be described with reference to the drawings.

Figure 1:
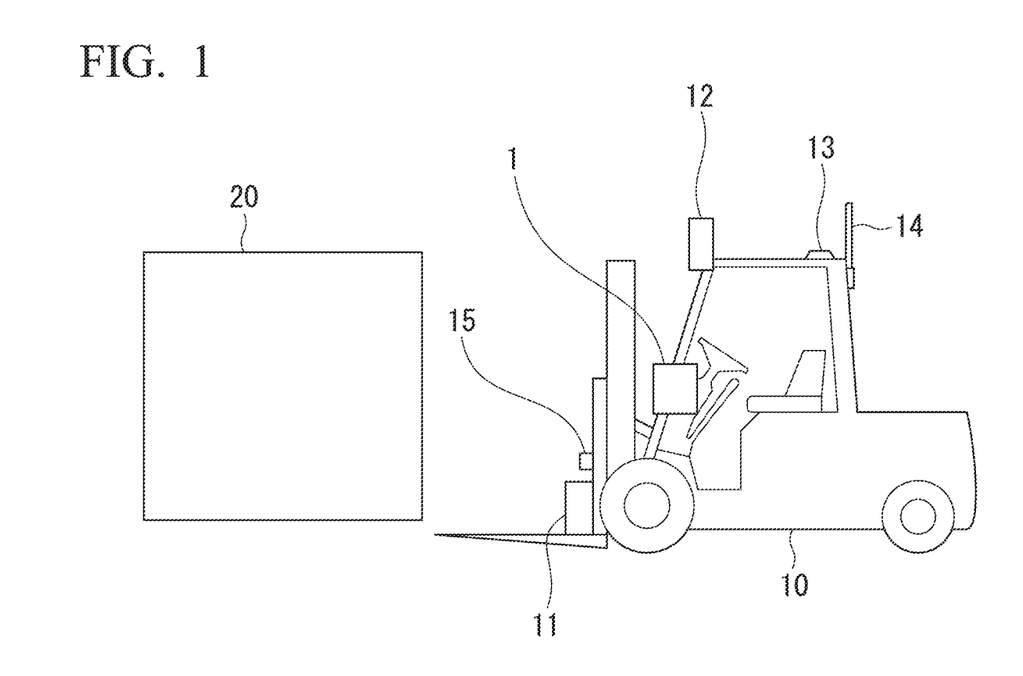
FIG. 1 is a diagram showing a cargo management device according to a first embodiment of the present invention.

FIG. 1 is a diagram showing a relationship between a forklift and a container according to the embodiment.

In FIG. 1, a forklift 10 is an example of a transport vehicle. Further, a container 20 is an example of a cargo. The forklift 10 includes a cargo management device 1, a first antenna 11, a second antenna 12, a satellite positioning antenna 13, a communication antenna 14, and a first tag 15.

The first antenna 11 is attached to a fork (a cargo gripping mechanism) of the forklift 10. The forklift 10 transports the container 20 in response to an operation of a driver. When the forklift 10 moves the container 20 to another position, the forklift 10 lifts the container 20 up to a predetermined height. The driver operates the forklift 10 to lift the container 20 up to the predetermined height to thereby secure the field of vision of the driver during driving. The second antenna 12 is provided in the forklift 10 in advance so as to be located near the first antenna 11 at the predetermined height to which the container 20 is lifted up due to the operation of the driver when the forklift 10 transports the container 20.

The first tag 15 is provided at a predetermined position of the forklift 10 at which reflected waves obtained by a radio signal transmitted from the first antenna 11 being reflected by the container 20 can be received. The container 20 cannot be managed in a state in which the RFID tag serving as a cargo tag is not attached to the container 20. Therefore, when the forklift 10 transports the container 20 to which no RFID tag is attached, the radio signal transmitted from the first antenna 11 is reflected by the container 20, and the first tag receives the reflected radio signal. The first tag transmits a first forklift identifier (a first ID) on the basis of reception of the reflected radio signal. The radio signal of the first forklift ID is reflected by the container 20 and received by the first antenna 11. It is able to be determined that the container 20 to which no RFID tag is attached is being transported by receiving the first forklift ID at the first antenna 11. When the RFID tag is attached to the container 20, at least the first antenna 11 can receive both of the cargo ID transmitted from the cargo tag attached to the container 20 and the first forklift ID transmitted from the first tag 15.

It should be noted that the first tag 15 is normally provided at a position at which the radio signal cannot be detected according to directivity of the radio signal transmitted from the first antenna 11. The radio signal is reflected due to the presence of a reflecting member such as the container 20 on the fork, and the first tag 15 is an RFID tag that can transmit the first forklift ID by receiving the reflected radio signal.

The satellite positioning antenna 13 is an antenna that receives a signal from an artificial satellite. The cargo management device 1 receives a signal from the artificial satellite and acquires information included in the signal. The cargo management device 1 determines a position of the forklift 10 on the basis of the information included in the signal.

The communication antenna 14 is an antenna that transmits and receives a signal when the cargo management device 1 communicates with another device. The communication antenna 14 is connected to the cargo management device 1 by a cable.

The cargo management device 1 determines a carrying-in source or a carrying-out destination of a cargo such as the container 20. Further, the cargo management device 1 detects that the container 20 to which no cargo tag is attached is being transported. Hereinafter, the cargo management device 1 will be described in detail.

Figure 2:
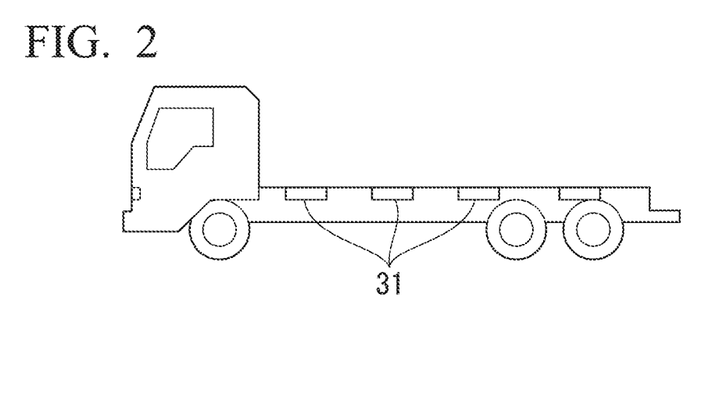
FIG. 2 is a first diagram showing an example of a carrying-in source or a carrying-out destination according to the first embodiment of the present invention.

FIG. 2 is a first diagram showing an example of the carrying-in source or the carrying-out destination.

The example of the carrying-in source or the carrying-out destination shown in FIG. 2 shows a first truck. Placement position tags 31 that are placement position ID transmission devices are attached to the first truck.

Figure 3:
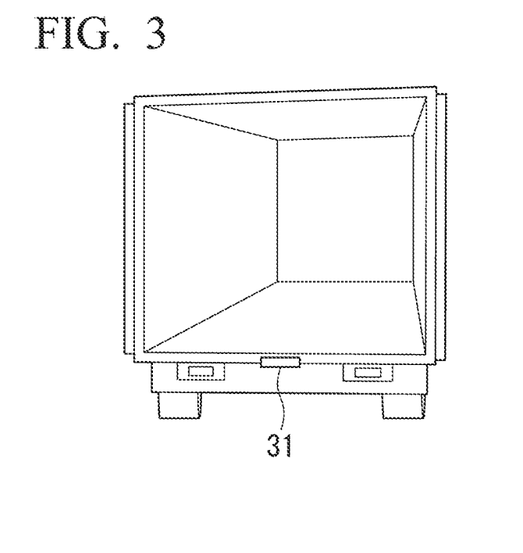
FIG. 3 is a second diagram showing an example of the carrying-in source or the carrying-out destination according to the first embodiment of the present invention.

FIG. 3 is a second diagram showing the example of the carrying-in source or the carrying-out destination.

The example of the carrying-in source or the carrying-out destination shown in FIG. 3 shows a second truck. Placement position tags 31 are also attached to the second truck.

Figure 4:
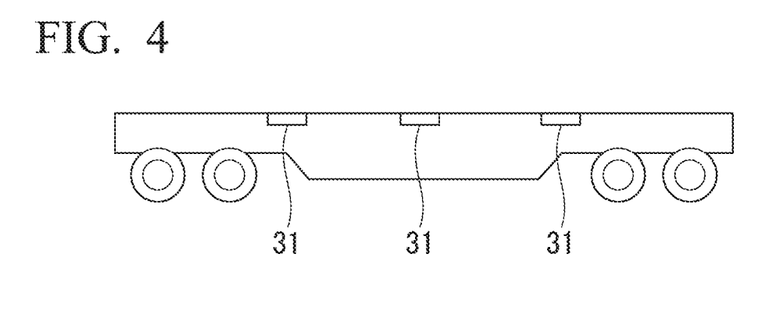
FIG. 4 is a third diagram showing an example of the carrying-in source or the carrying-out destination according to the first embodiment of the present invention.

FIG. 4 is a third diagram showing the example of the carrying-in source or the carrying-out destination.

The example of the carrying-in source or the carrying-out destination shown in FIG. 4 shows a freight vehicle. Placement position tags 31 are also attached to the freight vehicle.

Figure 5:
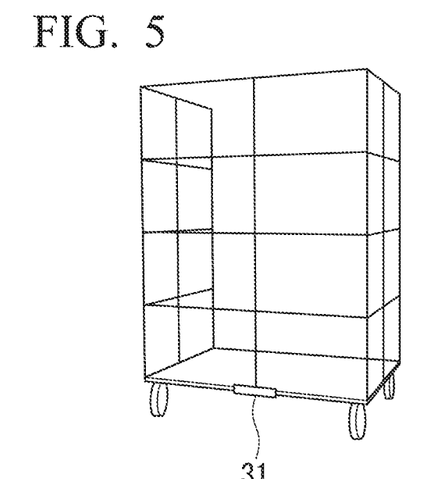
FIG. 5 is a fourth diagram showing an example of the carrying-in source or the carrying-out destination according to the first embodiment of the present invention.

FIG. 5 is a fourth diagram showing an example of the carrying-in source or the carrying-out destination.

The example of the carrying-in source or the carrying-out destination shown in FIG. 5 shows a cage cart. Placement position tags 31 are also attached to the cage cart.

The cargo management device 1 according to the embodiment specifies a site such as a container yard, or the carrying-in source or the carrying-out destination such as the truck, the freight vehicle, and the cage cart shown in FIGS. 2 to 5. The truck, the freight vehicle, the cage cart, and the like are examples of a loading structure on which the container 20 is loaded.

Figure 6:
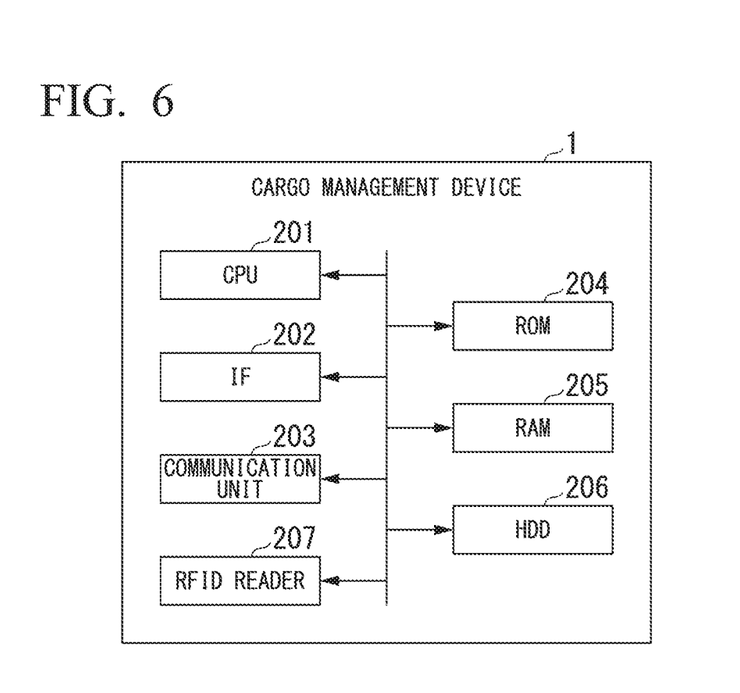
FIG. 6 is a diagram showing a hardware configuration of a cargo management device according to the first embodiment of the present invention.

FIG. 6 is a diagram showing a hardware configuration of the cargo management device.

As shown in FIG. 6, the cargo management device 1 includes components such as a central processing unit (CPU) 201, an interface (IF) 202, a communication unit 203, a read only memory (ROM) 204, a random access memory (RAM) 205, a hard disk drive (HDD) 206, and an RFID reader 207. The communication unit 203 performs transmission and reception of a signal via the communication antenna 14. The RFID reader 207 performs control of reception of signals received by the first antenna 11 or the second antenna 12. The IF 202 is connected to, for example, a touch panel display provided in the cargo management device 1.

Figure 7:
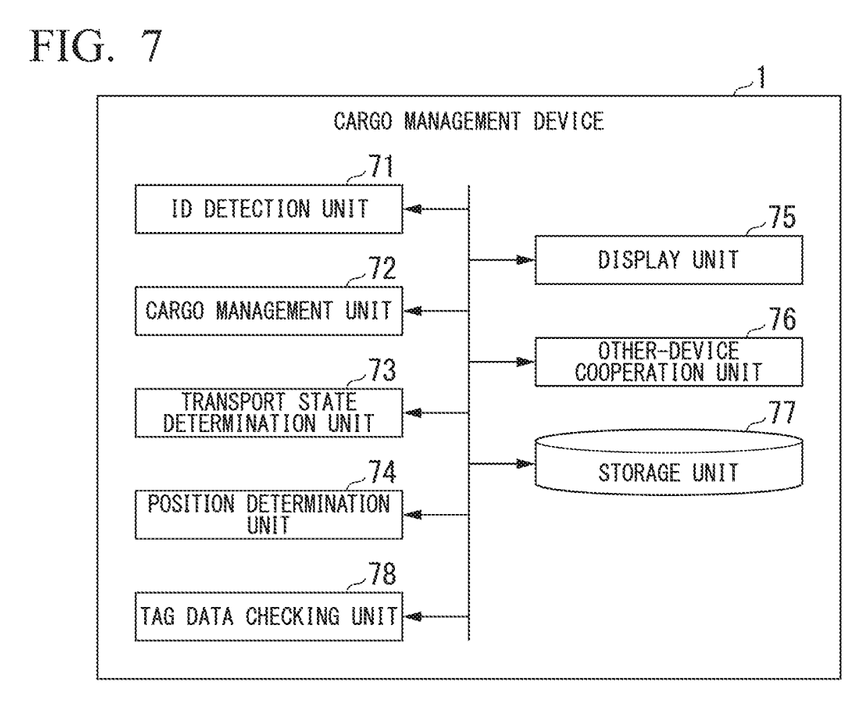
FIG. 7 is a functional block diagram of the cargo management device according to the first embodiment of the present invention.

FIG. 7 is a functional block diagram of the cargo management device.

The cargo management device 1 includes functions of an ID detection unit 71, a cargo management unit 72, a transport state determination unit 73, a position determination unit 74, a display unit 75, an other-device cooperation unit 76, and a tag data checking unit 78 by the CPU 101 executing a program that is stored in advance. Further, the cargo management device 1 includes a storage unit 77.

The ID detection unit 71 detects the ID on the basis of the signal transmitted from a cargo tag 21, the placement position tag 31 or the first tag 15. The ID is a cargo ID, a placement position ID, a first forklift ID, or the like. The cargo ID includes at least identification information of the cargo. For example, the cargo is uniquely identified by the cargo ID. The placement position ID includes at least identification information of the truck, the freight vehicle, the cage cart, or the like of which a placement position can be specified. For example, the truck, the freight vehicle, and the cage cart are uniquely identified by the placement position ID. The first forklift ID includes first identification information for identifying the forklift 10.

The cargo management unit 72 determines the carrying-in source or the carrying-out destination of the container 20, which is a cargo, according to an ID detection situation of the ID detection unit 71.

The transport state determination unit 73 determines a cargo transport state of the forklift 10 according to a situation in which the cargo ID has been detected by the first antenna 11 or the second antenna 12. Further, the transport state determination unit 73 determines that the container 20 to which no RFID tag is attached is being transported.

The position determination unit 74 determines a position of the forklift 10 on the basis of a signal transmitted from the satellite via the satellite positioning antenna 13.

The display unit 75 displays information on the cargo management device 1.

The other-device cooperation unit 76 transmits and receives information to and from another device connected via the communication antenna 14.

The tag data checking unit 78 checks a data system included in the received cargo ID, the received placement position ID, the received first forklift ID, and the like.

The storage unit 77 stores various types of information.

Figure 8:
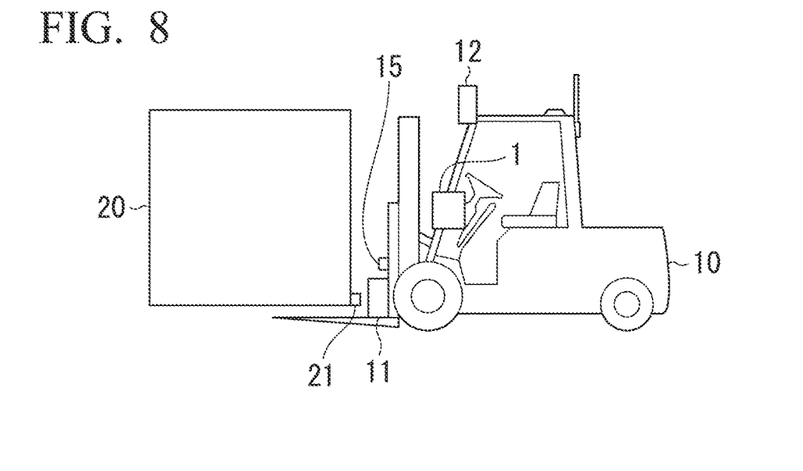
FIG. 8 is a diagram showing a first operation example of a forklift according to the first embodiment of the present invention.

FIG. 8 is a diagram showing a first operation example of the forklift.

FIG. 8 shows a state in which the forklift 10 inserts a fork of the forklift 10 under a bottom of a container 20 placed at a site such as a container yard. This example is a situation to be viewed at a first timing when the forklift 10 lifts up the container 20 from the ground and starts to carry the container 20 or a second timing when the forklift 10 moves the container 20 and places the container 20 at a predetermined position at the site.

In the case where the cargo management unit 72 determines that the first timing occurs, the cargo management unit 72 first determines that the cargo ID is not received by the first antenna 11 and the second antenna 12 in a state in which the container 20 is not being carried (1-a). Then, in a case in which the fork is inserted under the container 20, the cargo management unit 72 determines that the cargo ID and the first forklift ID are received only by the first antenna 11 if the cargo tag 21 is attached to the container 20 (1-b1). The cargo management unit 72 determines that the first forklift ID are received only by the first antenna 11 if the cargo tag 21 is not attached to the antenna 21 (1-b2). When such a time-series situation occurs, the cargo management unit 72 determines that the first timing has occurred. It should be noted that the second antenna 12 is attached to the forklift 10 so that the cargo ID or the first forklift ID cannot be detected due to directivity of radio waves in the situation 1-b.

In the case where the cargo management unit 72 determines that the second timing occurs, the driver operates the forklift 10 to lift the container 20 up, and the cargo management unit 72 determines that the cargo ID and the first forklift ID are received by both the first antenna 11 and the second antenna 12 if the cargo tag 21 is attached to the container 20 (2-a1). Further, in a case in which the driver operates the forklift 10 to lift the container 20 up, the cargo management unit 72 determines that the first forklift ID is received by both the first antenna 11 and the second antenna 12 if the cargo tag 21 is not attached to the container 20 (2-a2). In a case in which the forklift 10 places the container 20 at a movement destination, the cargo management unit 72 determines that the cargo ID and the first forklift ID are received only by the first antenna 11 if the cargo tag 21 is attached to the container 20 (2-b1). Further, in a case in which the forklift 10 places the container 20 at a movement destination, the cargo management unit 72 determines that the first forklift ID are received only by the first antenna 11 if the cargo tag 21 is not attached to the container 20 (2-b2). When the forklift 10 is reversed, the cargo management unit 72 determines that the cargo ID and the first forklift ID are not received by both the first antenna 11 and the second antenna 12 (2-c). When such a time-series situation occurs, the cargo management unit 72 determines that the second timing has occurred. It should be noted that the second antenna 12 is attached to the forklift 10 so that the cargo ID cannot be detected due to directivity of radio waves in the situation 2-b1 or 2b-2.

Figure 9:
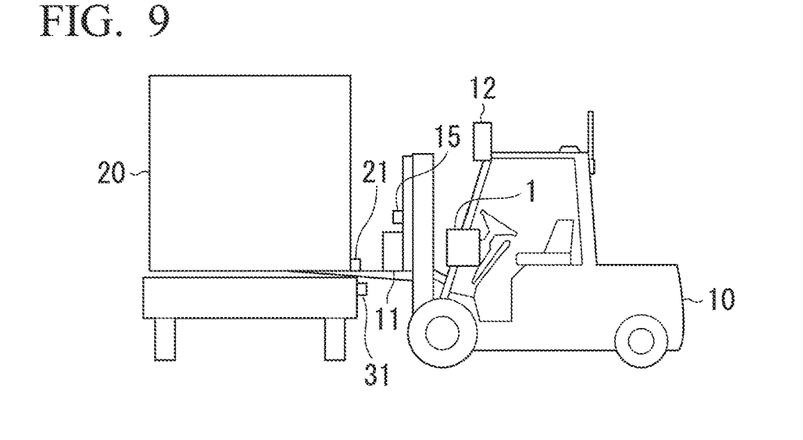
FIG. 9 is a diagram showing a second operation example of the forklift according to the first embodiment of the present invention.

FIG. 9 is a diagram showing a second operation example of the forklift.

FIG. 9 shows a state in which the forklift 10 inserts the fork of the forklift 10 under the bottom of the container 20 in a state in which the container 20 is disposed in a freight vehicle which loads the container 20. This example is a situation to be viewed at a third timing when the forklift 10 lifts the container 20 up from the freight vehicle and starts to transport the container 20 to another position, or a fourth timing when the forklift 10 moves the container 20 from another position to the freight vehicle and loads the container 20 onto the freight vehicle.

In the case where the cargo management unit 72 determines that the third timing occurs, the cargo management unit 72 first determines that both the first antenna 11 and the second antenna 12 cannot detect the cargo ID and the first forklift ID (3-a). Then, the cargo management unit 72 determines that the cargo ID, the placement position ID and the first forklift ID are detected by the first antenna 11 if the cargo tag 21 is attached to the container 20 (3-b1). Further, the cargo management unit 72 determines that the placement position ID and the first forklift ID are detected by the first antenna 11 if the cargo tag 21 is not attached to the container 20 (3-b2). When such a time-series situation occurs, the cargo management unit 72 determines that the third timing has occurred. It should be noted that the second antenna 12 is attached to the forklift 10 so that the cargo ID, the placement position ID or the first forklift ID cannot be detected due to directivity of radio waves in the situation 3-b1 or 3-b2.

In the case where the cargo management unit 72 determines that the fourth timing occurs, the cargo management unit 72 determines that the cargo ID and the first forklift ID are detected by both the first antenna 11 and the second antenna 12 while the forklift 10 is traveling if the cargo tag 21 is attached to the container 20 (4-a1). Further, in the case where the cargo management unit 72 determines that the fourth timing occurs, the cargo management unit 72 determines that the first forklift ID has been detected by both the first antenna 11 and the second antenna 12 while the forklift 10 is traveling if the cargo tag 21 is not attached to the container 20 (4-a2). Then, in a case in which the container 20 is disposed on the freight car, the cargo management unit 72 determines that the cargo ID and the first forklift ID cannot be detected by the second antenna 12 if the cargo tag 21 is attached to the container 20, (4-b1). Further, in a case in which the container 20 is disposed on the freight car, the cargo management unit 72 determines that the first forklift ID cannot be detected by the second antenna 12 if the cargo tag 21 is not attached to the container 20 (4-b2). Then, if the cargo tag 21 is attached to the container 20, the cargo management unit 72 determines that the cargo ID, the placement position ID and the first forklift ID are detected by the first antenna 11 (4-c1). Further, if the cargo tag 21 is not attached to the container 20, the cargo management unit 72 determines that the placement position ID and the first forklift ID are detected by the first antenna 11 (4-c2). When such a time-series situation occurs, the cargo management unit 72 determines that the fourth timing has occurred. It should be noted that the second antenna 12 is attached to the forklift 10 so that the cargo ID, the placement position ID, the first forklift ID, and the like cannot be detected due to directivity of radio waves in the situation 4-c1 or 4-c2.

Figure 10:
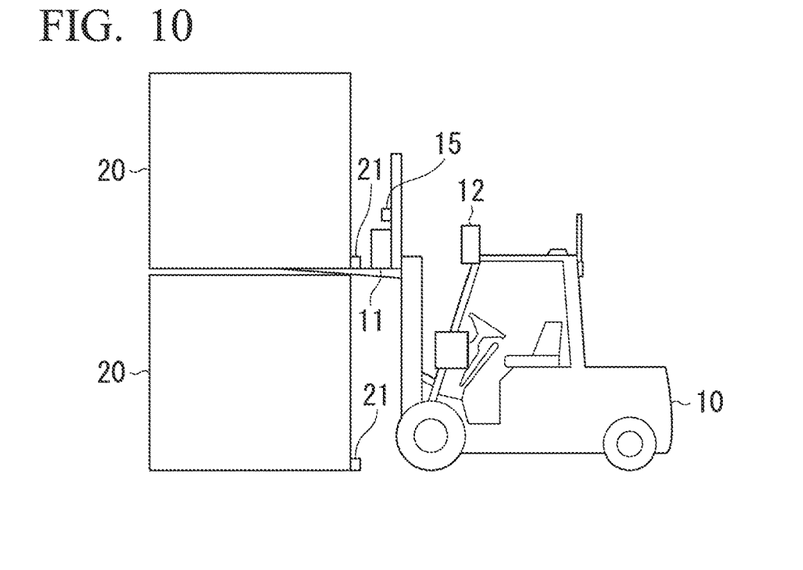
FIG. 10 is a diagram showing a third operation example of the forklift according to the first embodiment of the present invention.

FIG. 10 is a diagram showing a third operation example of the forklift.

FIG. 10 shows a state in which the forklift 10 inserts the fork of the forklift 10 under a bottom of a container 20 placed at an upper stage in a state in which containers 20 are disposed in a stacked state. This example is a situation to be viewed at a fifth timing when the forklift 10 lifts up the container 20 disposed at the upper stage and starts to carry the container 20 to another position or a sixth timing when the disposition of the container 20 that the forklift 10 has moved from the other position onto another container 20 is assumed to have been completed.

In the case where the cargo management unit 72 determines that the fifth timing occurs, the cargo management unit 72 first determines that the cargo ID and the first forklift ID cannot be detected by both the first antenna 11 and the second antenna 12 since the forklift 10 does not carry the container 20 (5-a). Then, since the fork of the forklift 10 is inserted under the bottom of the container 20 in the upper stage, the cargo management unit 72 determines that the cargo ID and the first forklift ID are detected by both the first antenna 11 and the second antenna 12 if the cargo tag 21 is attached to the container 20 (5-b1). Further, since the fork of the forklift 10 is inserted under the bottom of the container 20 in the upper stage, the cargo management unit 72 determines that the first forklift ID are detected by both the first antenna 11 and the second antenna 12 if the cargo tag 21 is not attached to the container 20 (5-b2). When such a time-series situation occurs, the cargo management unit 72 determines that the fifth timing has occurred.

In the case where the cargo management unit 72 determines that the sixth timing occurs, the cargo management unit 72 determines that the cargo ID and the first forklift ID are detected by both the first antenna 11 and the second antenna 12 while the forklift 10 is traveling if the cargo tag 21 is attached to the container 20 (6-a1). If the cargo tag 21 is not attached to the container 20, the cargo management unit 72 determines that the first forklift ID are detected by both the first antenna 11 and the second antenna 12 while the forklift 10 is traveling (6-a2). Further, the cargo management unit 72 determines that a period of time during which the cargo ID or the first forklift ID is detected by both the first antenna 11 and the second antenna 12 is equal to or longer than a predetermined time (6-b). Further, the cargo management unit 72 determines that the cargo ID and the first forklift ID cannot be detected by both the first antenna 11 and the second antenna 12. When such a time-series situation occurs, the cargo management unit 72 determines that the sixth timing has occurred.

Each of the schemes of determining the timings shown in FIGS. 8 to 10 described above is an example, and the cargo management unit 72 may determine each of the above timings or other timings according to reception timings of the cargo ID, the placement position ID or the first forklift ID received by the first antenna 11 or the second antenna 12 or a time-series reception situation.

Figure 11:
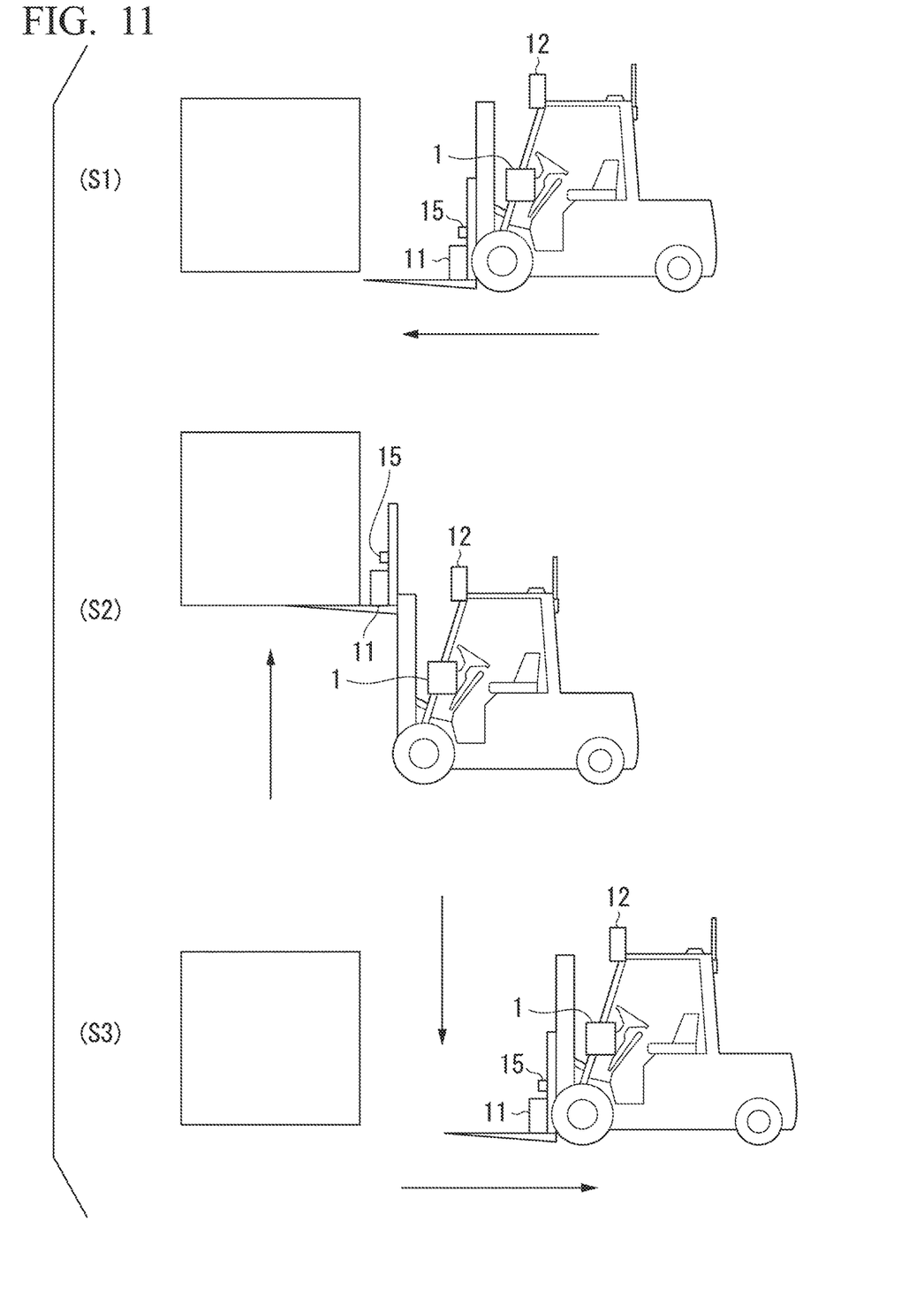
FIG. 11 is a first diagram showing a series of operations of the forklift according to the first embodiment of the present invention.

FIG. 11 is a first diagram showing a series of operations of the forklift.

Next, an example in which a forklift disposes the container 20 placed on a site such as a container yard to another position in the site will be described. In this case, a position at which the container 20 at the site of the container yard has been placed is a carrying-in source. Further, another position is a carrying-out destination. Further, the description will be given using an example in a case in which no cargo tag is attached to the container 20.

The driver operates the forklift 10 to insert the fork of the forklift 10 under the bottom of the container 20 (step S1). Accordingly, a radio signal transmitted by the first antenna 11 is reflected by the container 20. The first tag 15 transmits the first forklift ID on the basis of reception of a reflected signal of the radio signal transmitted from the first antenna 11. The first antenna 11 receives the first forklift ID. The cargo management unit 72 determines that the first forklift ID is detected in the first antenna 11 and detects that the first timing occurs. The cargo management unit 72 acquires a current position of the forklift 10 at a time when the first forklift ID is acquired, from the position determination unit 74. The cargo management unit 72 primarily records the information indicating that the cargo tag 21 is not attached and the current position in the storage unit 77. Further, the cargo management unit 72 outputs the information indicating that the cargo tag 21 is not attached, and the current position to the other-device cooperation unit 76. The other-device cooperation unit 76 may notify the high-level system of the information indicating that the cargo tag 21 is not attached, the current position and the first forklift ID. This notification may include information indicating that the first timing occurs. Through such process, the high-level system can manage which forklift works and when, where, to which cargo and what it is doing. Further, the high-level system is able to determine where the container 20 to which the cargo tag 21 is not attached is.

The driver operates the forklift 10 to move the container 20 to the other position in the site. In this case, the driver lifts the fork of the forklift 10 up to secure his field of vision (step S2). Then, each of the first antenna 11 and the second antenna 12 receive the first forklift ID. When a shift from the first timing to this state occurs, the transport state determination unit 73 determines that transport is being performed. When the forklift 10 arrives at a placement position of a predetermined carrying-out destination in the site, the container 20 is disposed at that position. In this case, the second antenna 12 cannot detect the first forklift ID. The cargo management unit 72 detects that the second timing occurs. The cargo management unit 72 acquires the current position at the time of detection of the second timing, from the position determination unit 74. When the forklift 10 is reversed, the cargo management unit 72 determines that the first forklift ID cannot be detected by the first antenna 11 (step S3). The cargo management unit 72 outputs the first forklift ID which is no longer detected by the first antenna 11 and the second antenna 12 and the current position to the other-device cooperation unit 76. The other-device cooperation unit 76 may notify the high-level system of the first forklift ID, the current position and the detection of the second timing. Through such process, the high-level system can manage which forklift works and when, where, to which cargo and what it is doing. Further, the high-level system can determine where the container 20 to which no cargo tag 21 is attached is.

Figure 12:
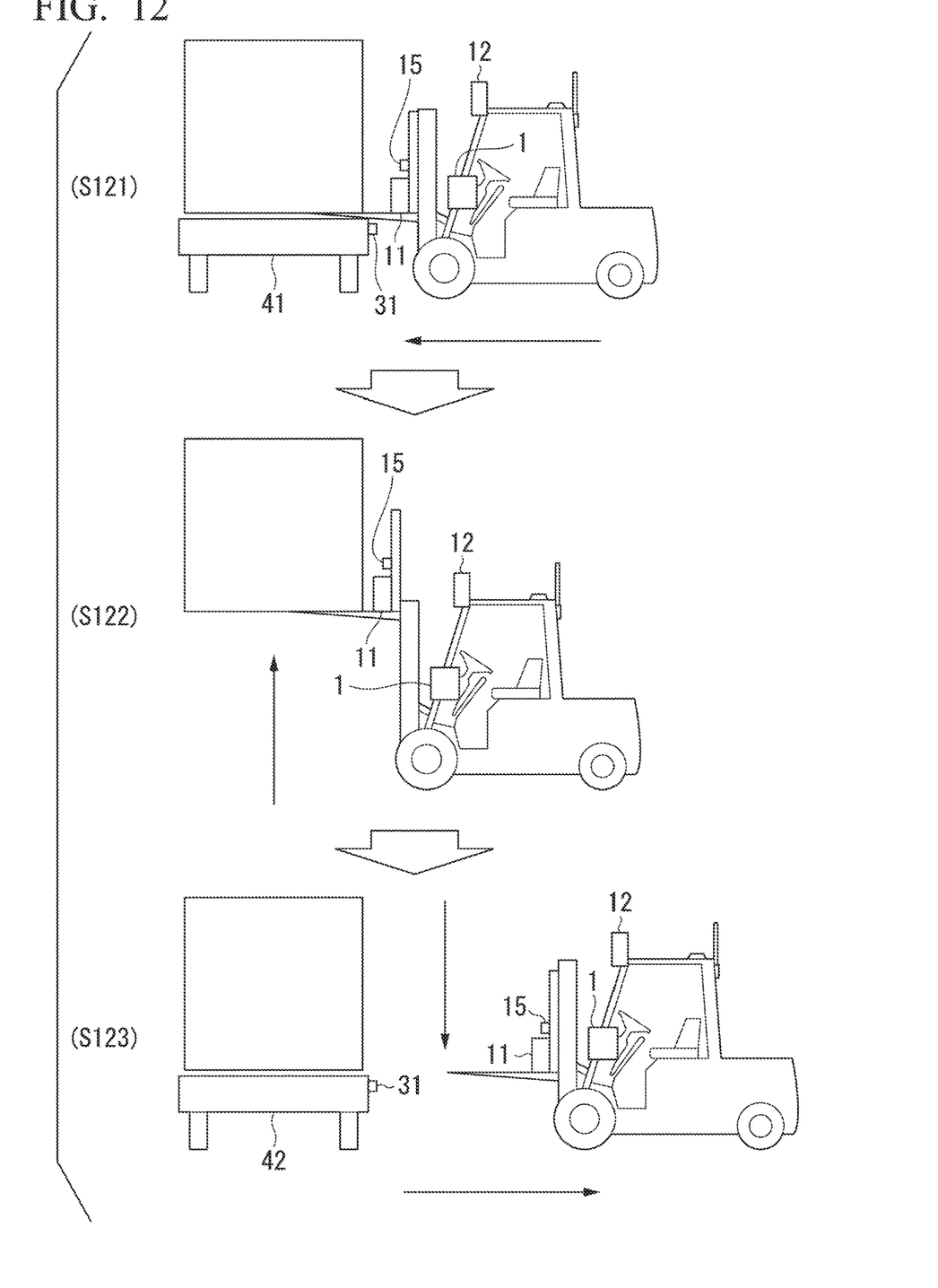
FIG. 12 is a second diagram showing a series of operations of the forklift according to the first embodiment of the present invention.

FIG. 12 is a second diagram showing a series of operations of the forklift.

Next, an example in a case in which the forklift 10 disposes the container 20 placed on one freight vehicle 41 onto the other freight vehicle 42 will be described. In this case, the one freight vehicle 41 is a carrying-in source. Further, the other freight vehicle 42 is a carrying-out destination. It should be noted that the description will be given using an example in a case in which no cargo tag is attached to the container 20.

The driver operates the forklift 10 to insert the fork of the forklift 10 under the bottom of the container 20 loaded on the freight vehicle 41 (step S121). Accordingly, the radio signal transmitted by the first antenna 11 is reflected by the container 20. The first tag 15 receives a reflected signal of the radio signal transmitted from the first antenna 11 and transmits the first forklift ID on the basis of the received reflected signal. The first antenna 11 receives the first forklift ID. Further, the first antenna 11 receives the placement position ID transmitted from the placement position tag 31. The cargo management unit 72 determines that the first forklift ID and the placement position ID are detected in the first antenna 11 and detects that the third timing occurs (FIG. 9). The tag data checking unit 78 may determine whether or not the placement position ID indicates the freight vehicle. For example, when the forklift 10 carries the cargo out from a pre-designated freight vehicle, the tag data checking unit 78 may determine whether the placement position ID indicates the freight vehicle and determine that a warning display is to be performed when the placement position ID does not indicate the freight vehicle. When a plurality of containers 20 are disposed side by side on the freight vehicle 41, the first antenna 11 is likely to receive the cargo IDs from the cargo tags 21 attached to the other containers 20. When the cargo management unit 72 detects the cargo IDs of the containers 20, the cargo management unit 72 may determine whether the signal has the same degree of reception intensity as the first forklift ID, and discard the signal when the signal does not have the same degree of signal intensity as the first forklift ID. Further, in this case, when a plurality of placement position tags 31 are attached to the freight vehicle, the cargo management unit 72 is likely to determine that placement position IDs are received. In this case, the cargo management unit 72 determines whether or not the placement position ID is received through a signal having the same degree of signal intensity as the signal intensity of the signal through which the first forklift ID is received. When the placement position ID is received through the signal having the same degree of signal intensity as the signal intensity of the first forklift ID, the position of the cargo to which the cargo tag 21 is not attached and the placement position substantially match each other. Therefore, the cargo management unit 72 acquires the placement position ID received with the same degree of signal intensity as the first forklift ID.

The cargo management unit 72 acquires the current position of the forklift 10 at a time when the first forklift ID and the placement position ID are acquired from the position determination unit 74. The cargo management unit 72 primarily records the first forklift ID, the placement position ID and the current position in the storage unit 77. Further, the cargo management unit 72 outputs the first forklift ID, the placement position ID and the current position to the other-device cooperation unit 76. The other-device cooperation unit 76 may notify the upper-level system of the first forklift ID, the placement position ID and the current position. This notification may include information indicating that the third timing occurs. Through such process, the high-level system can manage when, where, to which cargo and what the forklift is doing. Further, the high-level system can determine where the container 20 to which no cargo tag 21 is attached is.

The driver operates the forklift 10 to move the container 20 onto the other freight vehicle 42. In this case, the driver lifts the fork of the forklift 10 up to secure his field of vision (step S122). Then, each of the first antenna 11 and the second antenna 12 receives the first forklift ID. When a shift from the third timing to this state occurs, the transport state determination unit 73 determines that transport is being performed. When the driver arrives at the other freight vehicle 42, the driver places the container 20 on the freight vehicle 42. In this case, the second antenna 12 cannot detect the first forklift ID. Further, the first antenna 11 receives the first forklift ID and the placement position ID of the placement position tag 31 attached to the freight vehicle 42. Accordingly, the cargo management unit 72 detects that the fourth timing occurs. In this case, when a plurality of placement position tags 31 are attached to the freight vehicle, the cargo management unit 72 is likely to determine that placement position IDs are received. In this case, the cargo management unit 72 determines whether or not the placement position ID is received through a signal having the same degree of signal intensity as the signal intensity of the signal through which the first forklift ID is received. When the placement position ID is received through the signal having the same degree of signal intensity as the signal intensity of the first forklift ID, the position of the container 20 to which the cargo tag 21 is not attached and the placement position substantially match each other. Therefore, the cargo management unit 72 acquires the placement position ID received with the same degree of signal intensity as the signal intensity of the first forklift ID.

The cargo management unit 72 acquires the current position at the time of detection of the fourth timing, from the position determination unit 74. When the forklift 10 is reversed, the cargo management unit 72 cannot detect the first forklift ID and the placement position ID with the first antenna 11 (step S123). The cargo management unit 72 outputs the first forklift ID and the arrangement ID to the other-device cooperation unit 76. The other-device cooperation unit 76 may notify the high-level system of the first forklift ID, the placement position ID, the current position, the forklift ID and the detection of the fourth timing. Through such process, the high-level system can manage which forklift works and when, where, to which cargo and what it is doing. Further, the high-level system can determine where the container 20 to which no cargo tag 21 is attached is.

Figure 13:
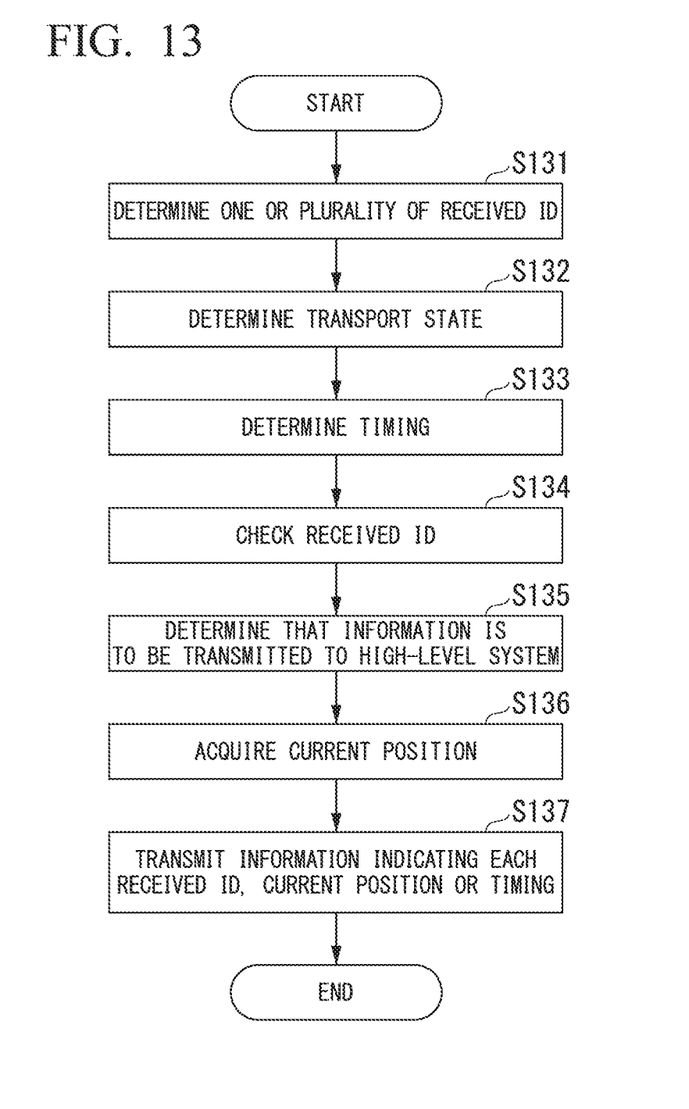
FIG. 13 is a diagram showing a process flow of the cargo management device 1 according to the first embodiment of the present invention.

FIG. 13 is a diagram showing a processing flow of the cargo management device 1.

In the cargo management device 1, the cargo management unit 72 determines whether the ID received in the first antenna 11 corresponds to one or some of the cargo ID, the placement position ID, the first forklift ID and a second forklift ID (step S131). Then, the transport state determination unit 73 determines a transport state of the forklift (step S132). The cargo management unit 72 detects the transport state, specifies the received ID and determines a current timing (for example, the first to sixth timings) on the basis of such recorded time-series information (step S133). Further, the tag data checking unit 78 checks the received cargo ID or the placement position ID (step S134). The tag data checking unit 78 may output warning information or the like to a monitor when a data system of the checked cargo ID or the placement position ID does not match the data system recorded in the storage unit 77. When the current timing is a predetermined timing, the cargo management unit 72 determines that the information is to be transmitted to the high-level system (step S135). The cargo management unit 72 acquires the current position from the position determination unit 74 (step S136). The cargo management unit 72 transmits information indicating the cargo ID, the placement position ID, the first forklift ID, the second forklift ID, the current position and the timing to the high-level system (step S137).

The cargo management device 1 may receive and store a work schedule list from the high-level system or the like in advance. In the work schedule list, an order of the cargo ID of a container to be transported, and information on the carrying-in source and the carrying-out destination are recorded. The cargo management unit 72 of the cargo management device 1 may compare the order of the cargo ID of the container to be transported or the carrying-in source and the carrying-out destination of the container 20 with the work schedule list to determine whether the order, the carrying-in source and the carrying-out destination match those in the work schedule list. In this case, the cargo management unit 72 may display warning information on a touch panel display or the like when time-series information on a work situation of the forklift 10 does not match that in the work schedule list. Accordingly, it is possible to reduce erroneous transfer of the cargo of an operator.

The cargo management device 1 may store a map in the storage unit and the display unit 75 may display the map and the current position on the display.

Further, the cargo management device 1 may detect each signal intensity from the cargo tag 21, the placement position tag 31, the first tag 15 and a second tag 16, store the signal intensity thereof, and manage a change in the signal intensity. The cargo management device 1 may determine whether or not the signal intensity becomes significantly weaker, and determine deterioration of the cargo tag 21, the placement position tag 31, the first tag 15 and the second tag 16 when the signal intensity becomes weaker. In this case, the cargo management device 1 outputs a deterioration signal including information (the cargo ID, the placement position ID, the first forklift ID or the second forklift ID) on the deteriorated cargo tag 21, placement position tag 31, first tag 15 or second tag 16 and the current position to the high-level system. Accordingly, it is possible to specify the deteriorated cargo tag 21 or placement position tag 31 in the high-level system.

The first antenna 11 or the second antenna 12 described above may have a function of controlling the directivity. For example, the cargo management device 1 may be able to electrically or mechanically change a direction of the directivity of the first antenna or the second antenna or a radio wave output intensity. For example, the directivity or output of the second antenna may be increased as compared to the first antenna, such that a signal from each tag at a distant place can be received.

Second Embodiment

Next, an example in a case in which the forklift includes the second tag 16 instead of the second antenna 12 will be described.

Figure 14:
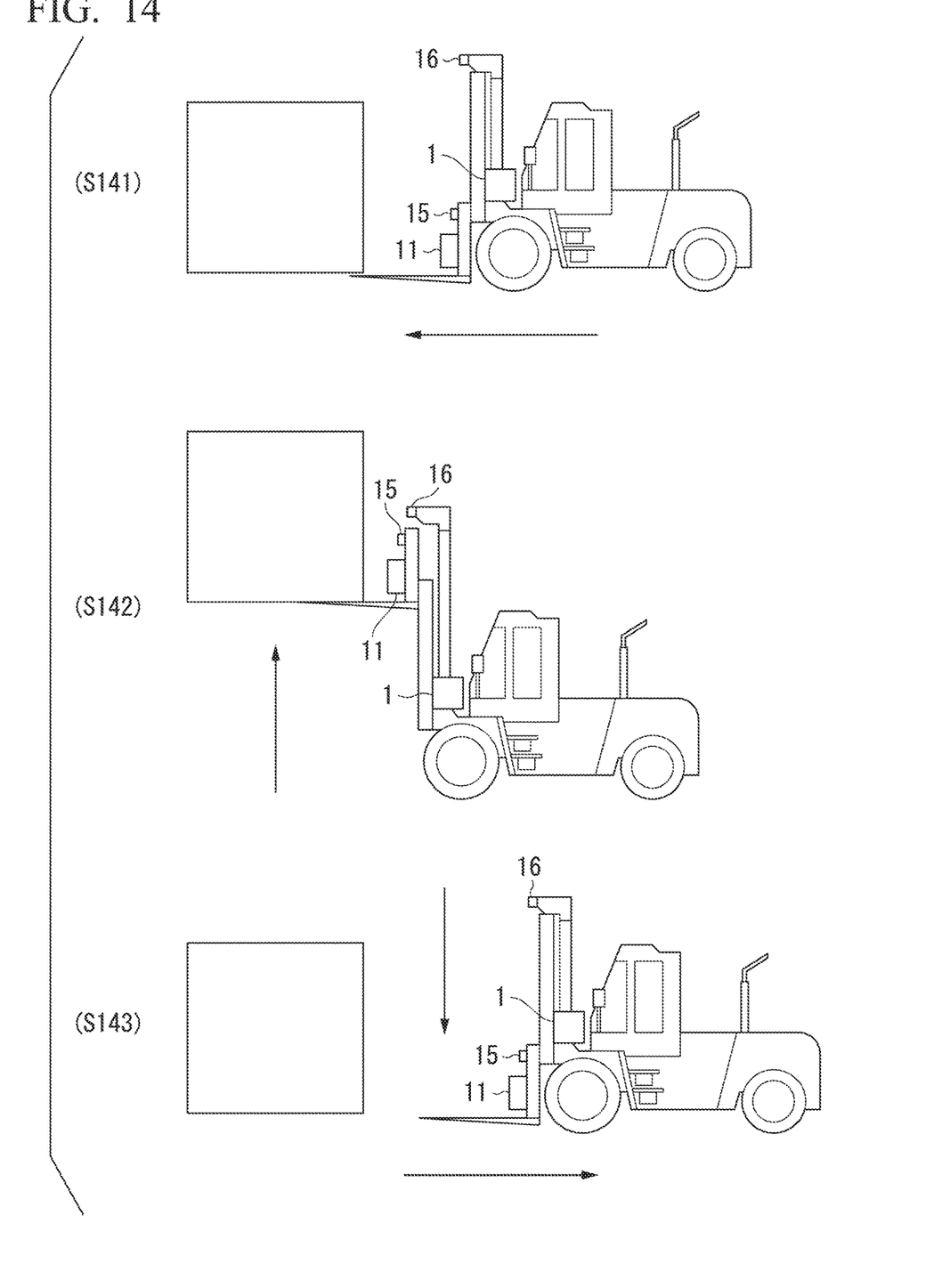
FIG. 14 is a first diagram showing a series of operations of a forklift according to a second embodiment of the present invention.

It is assumed that the second tag 16 is attached to the forklift 10, as shown in FIG. 14. The second tag 16 is attached to the forklift 10 in advance to be located near the first antenna 11 when the fork of the forklift 10 is lifted up to a predetermined height. The second tag 16 receives a signal obtained by a radio signal transmitted from the first antenna 11 being reflected by the container 20 when the fork is lifted up to the predetermined position. Accordingly, the second tag 16 transmits the second forklift ID. A signal of the second forklift ID is reflected by the container 20 and received by the first antenna 11.

FIG. 14 is a first diagram showing a series of operations of the forklift according to the second embodiment.

Next, an example of the second embodiment in a case in which the forklift 10 disposes the container 20 placed on a site such as a container yard, at another position in the site will be described. In this case, a position at which the container 20 at the site of the container yard has been placed is a carrying-in source. Further, another position is a carrying-out destination. Description will be given using an example in a case in which no cargo tag is attached to the container 20.

The driver operates the forklift 10 to insert the fork of the forklift 10 under the bottom of the container 20 (step S141). Accordingly, a radio signal transmitted by the first antenna 11 is reflected by the container 20. The first tag 15 receives the reflected signal of the radio signal transmitted from the first antenna 11 and transmits the first forklift ID on the basis of the received radio signal. The first antenna 11 receives the first forklift ID. The cargo management unit 72 determines that the first forklift ID is detected in the first antenna 11 and detects that the first timing occurs. The cargo management unit 72 acquires a current position of the forklift 10 at a time at which the first forklift ID is acquired, from the position determination unit 74. The cargo management unit 72 primarily records the information indicating that the cargo tag 21 is not attached and the current position in the storage unit 77. Further, the cargo management unit 72 outputs the information indicating that the cargo tag 21 is not attached and the current position to the other-device cooperation unit 76. The other-device cooperation unit 76 may notify the high-level system of the information indicating that the cargo tag 21 is not attached, the current position and the first forklift ID. This notification may include information indicating that the first timing occurs. Through such process, the high-level system can manage which forklift works and when, where, to which cargo and what it is doing. Further, in the high-level system, it is possible to determine where the container 20 to which no cargo tag 21 is attached is.

The driver operates the forklift 10 to move the container 20 to the other position in the site. In this case, the driver lifts the fork of the forklift 10 up to secure his field of vision (step S142). Then, each of the first antenna 11 and the second antenna 12 receives the first forklift ID and the second forklift ID. When a shift from the first timing to this state occurs, the transport state determination unit 73 determines that transport is being performed. When the driver arrives at the placement position as the predetermined carry-out destination in the site, the driver disposes the container 20 at that position. In this case, the second antenna 12 cannot detect the first forklift ID and the second forklift ID. Accordingly, the cargo management unit 72 detects that the second timing occurs. The cargo management unit 72 acquires the current position at the time of detection of the second timing, from the position determination unit 74. When the forklift 10 is reversed, the cargo management unit 72 determines that the first forklift ID cannot be detected with the first antenna 11 (step 143). The cargo management unit 72 outputs the first forklift ID and the second forklift ID which are not detected by the first antenna 11 and the second antenna 12 and the current position to the other-device cooperation unit 76. The other-device cooperation unit 76 may notify the high-level system of the first forklift ID, the second forklift ID, the current position and the detection of the second timing. Through such process, the high-level system can manage which forklift works and when, where, to which cargo and what it is doing. Further, the high-level system can determine where the container 20 to which no cargo tag 21 is attached is.

Figure 15:
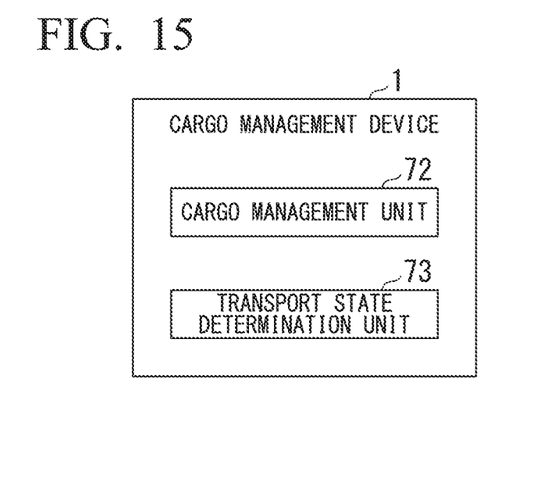
FIG. 15 is a diagram showing a minimum configuration of the cargo management device according to the embodiment of the present invention.

FIG. 15 is a diagram showing a minimum configuration of the cargo management device.

As shown in FIG. 15, a cargo management device 1 includes a cargo management unit 72 and a transport state determination unit 73.

The cargo management unit 72 determines whether or not a first ID is detected by the first antenna 11, wherein the first tag 15 is provided at a predetermined position of the forklift 10 at which the reflected waves of the radio signal transmitted from the first antenna 11 provided on the fork of the forklift 10 can be received, and the first ID is transmitted from the first tag 15 in response to the reception of the reflected waves.

When the first ID has been detected, the transport state determination unit 73 determines that the container 20 to which the cargo tag 21 is not attached is being transported.

The cargo management device described above has a computer system. The steps of each process described above are stored in the form of a program in a computer-readable recording medium, and the above process is performed by the computer reading and executing this program. Here, the computer-readable recording medium refers to a magnetic disk, a magneto-optical disk, a CD-ROM, a DVD-ROM, a semiconductor memory, or the like. Further, this computer program may be distributed to a computer via a communication line, and the computer receiving this distribution may execute the program.

Further, the above program may be a program for realizing some of the above-described functions. Furthermore, the above program may be a so-called differential file (differential program) which can realize the above-described functions in combination with a program already recorded in the computer system.

Priority is claimed on Japanese Patent Application No. 2016-054714, filed Mar. 18, 2016, the content of which is incorporated herein by reference.

INDUSTRIAL APPLICABILITY

The present invention is also applicable to applications in which it is indispensable to manage a cargo to be transported by a transport vehicle without obtaining hydraulic pressure information of a cargo gripping mechanism of the transport vehicle.

REFERENCE SIGNS LIST

1 Cargo management device
10 Forklift
11 First antenna
12 Second antenna
13 Satellite positioning antenna
14 Communication antenna
15 First tag
16 Second tag
20 Container
21 Cargo tag
71 ID detection unit
72 Cargo management unit
73 Transport state determination unit
74 Position determination unit
75 Display unit
76 Other-device cooperation unit
77 Storage unit
78 Tag data checking unit

The invention claimed is:

1. A cargo management device, comprising:
a cargo management unit configured to determine whether or not a first identifier (ID) is detected by a first antenna provided at a cargo gripping mechanism of a transport vehicle, wherein a first transmission device is provided at a predetermined position of the transport vehicle so as to receive reflected waves of a radio signal transmitted from the first antenna, and the first ID is transmitted from the first transmission device in response to reception of the reflected waves; and
a transport state determination unit configured to determine, in a case where the first ID is detected, that a cargo, to which no cargo ID transmission device is attached, is being transported,
wherein the cargo management unit is further configured to:
determine whether or not a second ID transmitted from a second transmission device is detected by the first antenna based on reception of the radio signal transmitted from the first antenna, the second transmission device being provided in the transport vehicle in advance to be located near the first antenna when the cargo gripping mechanism is lifted to a predetermined height, and
determine at least one of a carrying-in source and a carrying-out destination of the cargo according to a situation in which the first ID and the second ID are detected by the first antenna.

2. The cargo management device according to claim 1, wherein the cargo management unit is further configured to determine whether or not a cargo ID transmitted from the cargo ID transmission device attached to the cargo is detected by the first antenna.

3. The cargo management device according to claim 1, wherein
the cargo management unit is further configured to:
determine whether or not the first ID is detected by a second antenna provided in the transport vehicle in advance to be located near the first antenna when the cargo gripping mechanism is lifted to a predetermined height, and
determine the at least one of the carrying-in source and the carrying-out destination of the cargo according to a situation in which the first ID is detected by each of the first antenna and the second antenna.

4. The cargo management device according to claim 2, wherein the cargo ID differs from the first ID and the second ID.

5. A cargo management method, comprising:
determining whether or not a first ID is detected by a first antenna provided at a cargo gripping mechanism of a transport vehicle, wherein a first transmission device is provided at a predetermined position of the transport vehicle so as to receive reflected waves of a radio signal transmitted from the first antenna, and the first ID is transmitted from the first transmission device in response to reception of the reflected waves;
determining, in a case where the first ID is detected, that a cargo, to which no cargo ID transmission device is attached, is being transported;
determining whether or not a second ID transmitted from a second transmission device is detected by the first antenna based on reception of the radio signal transmitted from the first antenna, the second transmission device being provided in the transport vehicle in advance to be located near the first antenna when the cargo gripping mechanism is lifted to a predetermined height, and
determining at least one of a carrying-in source and a carrying-out destination of the cargo according to a situation in which the first ID and the second ID are detected by the first antenna.

6. A non-transitory computer-readable recording medium having a computer program that causes a computer of a cargo management device to function as:
a cargo management means that determines whether or not a first ID is detected by a first antenna provided at a cargo gripping mechanism of a transport vehicle, wherein a first transmission device is provided at a predetermined position of the transport vehicle so as to receive reflected waves of a radio signal transmitted from the first antenna, and the first ID is transmitted from the first transmission device in response to reception of the reflected waves; and
a transport state determination means that determines, in a case where the first ID is detected, that a cargo, to which no cargo ID transmission device is attached, is being transported,
wherein the cargo management means further:
determines whether or not a second ID transmitted from a second transmission device is detected by the first antenna based on reception of the radio signal transmitted from the first antenna, the second transmission device being provided in the transport vehicle in advance to be located near the first antenna when the cargo gripping mechanism is lifted to a predetermined height, and
determines at least one of a carrying-in source and a carrying-out destination of the cargo according to a situation in which the first ID and the second ID are detected by the first antenna.

\* \* \* \* \*